3,257,368
POLYMERIZATION PROCESS
De Loss E. Winkler, Orinda, and Kenzie Nozaki, El Cerrito, Calif., assignors to Shell Oil Company, New York, N.Y., a corporation of Delaware
No Drawing. Filed Dec. 28, 1960, Ser. No. 78,840
3 Claims. (Cl. 260—93.7)

This application is a continuation-in-part of Serial No. 793,250, filed February 16, 1959, now U.S. Patent 2,971,925.

This invention relates to the polymerization of alpha-monoolefins. More particularly it relates to such polymerizations using novel polymerization catalysts.

It is known that alpha-monoolefins such as ethylene, propylene, styrene, octene-1, decene-1 and other alpha-monoolefins may be polymerized to produce linear polymers which are substantially free of cross-linking and side branching. The processes by which this is accomplished have come to be termed "low pressure processes" or "Ziegler processes." The polymers are prepared in the presence of the so-called "low pressure catalysts" or "Ziegler catalysts." In the broadest embodiment, the low pressure catalysts may be defined as the reaction product of a transition metal compound wherein the metal is selected from Group IV–VIII of the Periodic Table and a strong reducing agent, particularly compounds of metals of Groups I–III of the Periodic Table. From this broad definition it will be seen that the low pressure catalysts may comprise a nearly infinite number of combinations and permutations, and indeed many combinations are described in the prior art. Nevertheless, while there are many catalysts within this group that can be used to polymerize alpha-monoolefins it is recognized that the catalyst compositions and the methods of using them in polymerization of alpha-olefins are extremely sensitive. For example, seemingly minor impurities contained in the catalyst components or in the monomer to be polymerized may have adverse effects on the ultimate polymer. Similarly, seemingly minor variations in catalyst formulations, as in the proportions of the components, may have substantial effects on the molecular weight and molecular weight distribution of the polymer. Further the percentage of linearity of the polymer may be also affected by such modifications and this in turn can be correlated to the ultimate performance of the polymer during processing and to its utility. The present invention affords a method for utilizing a unique low pressure catalyst in the production of polymers of alpha-monoolefins which are characterized by a very high degree of linearity. This is of considerable importance, as it relates to the ultimate performance of the polymer.

It is an object of this invention to provide polymers of alpha-monoolefins which polymers have improved physical properties. It is another object of this invention to provide methods of utilizing novel low pressure catalysts in the production of improved polymers of propylene and other alpha-monoolefins. Other objects will become apparent as the description of this invention proceeds.

These and other objects are accomplished by contacting alpha-monoolefins with a catalyst composition produced by the steps comprising (1) reacting hydrocarbon solutions of aluminum triethyl and titanium tetrachloride in a mole ratio ranging from about .1:1 to less than .4:1 at elevated temperatures until the aluminum triethyl is completely oxidized and (2) thereafter reacting the total product of (1) with a hydrocarbon solution of aluminum diethyl chloride in an amount to give a total aluminum to titanium mole ratio of at least 1:1. The resulting product is a polymerization catalyst for alpha-monoolefins and it will hereinafter be shown to be capable of producing polymer having improved physical properties. This is particularly the case as it relates to the polymer of propylene.

From the foregoing description of the catalyst it will be seen that there is no choice in the selection of catalyst components as the specific compounds described above are essential. Furthermore the order of reaction is also critical as well as the amount of the specific catalyst components. The only substantial latitude permitted in the preparation of the new catalyst is in the heat treatments and in the concentrations of the components in the hydrocarbon solvents.

In the first step of the catalyst preparation the reaction between the titanium tetrachloride and the aluminum triethyl effects a reduction of at least part of the titanium tetrachloride to titanium trichloride. Stoichiometrically, complete reduction is accomplished by the reaction of .33 moles of aluminum triethyl with 1 mole of the titanium tetrachloride. For the purposes of this invention, it is found that there must not be .4 or more moles of the aluminum triethyl per mole of the titanium tetrachloride. Hence the reaction in the first step between the aluminum triethyl and the titanium tetrachloride must be in an aluminum triethyl to titanium tetrachloride mole ratio of less than .4 to 1. The minimum ratio is .1 to 1. In the more preferred procedures the mole ratio is between about .33:1 and 0.4:1, an effective mole ratio of about 0.33:1 being especially preferred, as these ratios ultimately produce the best combination of polymerization rates, conversions and percentages of linear polymer. Since impurities may use up some of the added aluminum triethyl, it may sometimes be desirable to add a slight excess of aluminum triethyl to assure that the effective ratio is as desired. For example, when an effective ratio of 0.33:1 is desired this can be assured by adding a slight excess, such as 0.34:1, 0.35:1 or 0.36:1.

The reaction between the titanium tetrachloride and aluminum triethyl is carried out at elevated temperatures for a period of time sufficient to oxidize at least all of the aluminum triethyl. The time is influenced by the temperature; heating for 20 minutes at 80° C. is suggested as a minimum; heating for 2 hours at 80° C. is suitable. A ratther surprising finding is that polypropylene of a substantially higher crystallinity is obtained if the heating is carried out for periods of time substantially in excess of the minimum required to oxidize the aluminum triethyl. Heating for as much as 24 hours or more at 80° C., 2 hours at 100° C. or 20 minutes at 170° C. results in a purple catalyst and an improved crystallinity of the product, as illustrated under the heading "Examples 17–20," hereinafter. It is believed that the increased crystallinity is due to the production of a different catalyst intermediate, formed by the longer or higher temperature heat treatment.

The initial reaction between the titanium tetrachloride and the aluminum triethyl is carried out with these reactants in solution in hydrocarbon solvents such as heptane, octane, pentane, isopentane and the like. Suitably, solutions of titanium tetrachloride and aluminum triethyl are prepared, and measured amounts of each solution are mixed together to give the desired mole ratios which, as previously indicated, range from an alumiunm-to-titanium mole ratio ranging from less than .4:1 to about .1:1. The reaction between titanium tetrachloride and aluminum triethyl at elevated temperatures terminates the first step of the catalyst preparation and at this point the reaction mixture comprises a solid suspension in the hydrocarbon medium and the total mixture has a brown or purple color, depending mainly on the time and temperature utilized for the reaction.

The hydrocarbon solutions of the catalyst components may be of any concentration. Solutions prepared by mixing 100 millimoles per liter of solvent are found to be convenient for subsequent metering. A surprising finding is that advantages in the ultimate polymer are obtained as the concentration of the components in the solvent is increased, as will be shown more fully hereinafter.

In the second step of the catalyst preparation aluminum diethyl chloride, which is suitably contained in solution in a hydrocarbon solvent, is added directly to the polymerization reaction mixture in an amount sufficient to provide a total aluminum-to-titanium mole ratio of at least 1.0. Any amount greater than the minimum is suitable but large excesses, say in the order of ten moles, are uneconomical and wasteful. In the preferred procedure, aluminum diethyl chloride is added in an amount to give a total aluminum-to-titanium mole ratio ranging from about 2:1 to about 6:1.

The use of the highly stereospecific catalysts prepared as described results in isotactic polymers of alpha-monoolefins of two or more carbon atoms. Particularly suitable are those of two to eight carbon atoms, e.g., ethylene, propylene, butene-1, pentene-1, octene-1, 3-methyl-pentene-1, 3-ethyl-pentene-1, 4-methyl-pentene-1, 3-methyl-heptene-1, vinyl-cyclohexene, styrene and the like. Steric factors of the monomers may, of course, affect the reaction. Mixtures of monomers may also be polymerized when a crystalline product is theoretically possible and is desired.

The polymerizations of alpha-monolefins with the novel catalysts are conducted in agitated pressure vessels under conditions that exclude air and other atmospheric impurities, particularly moisture. In one suitable method, the vessel, after purging with an inert gas, is charged with the catalyst suspension prepared as described above, having all $TiCl_4$ reduced to $TiCl_3$. An additional quantity of hydrocarbon solvent is usually added. The amount of aluminum diethyl chloride required to bring the Al:Ti ratio above 1:1 may also be added at this time, as such or in hydrocarbon solution. Thereafter the monomer to be polymerized is charged to the vessel and the polymerization begins. At first, the temperature within the reactor will rise due to an exotherm so that cooling may be supplied initially in order to maintain any desired polymerization temperature which, in all cases should be less than about 100° C. and more preferably from about 40 to 80° C. The pressures are not critical and may be autogenic pressures which will vary depending upon the quantity of the solvent in the reactor, the nature of the monomer to be polymerized, the temperature and the like. In batch operations, the polymerization may be terminated when monomer is no longer absorbed as indicated by a suitable pressure gauge. In continuous operations the polymerization mixture passes through a continuous reactor of any suitable design and the polymerizations in such cases are adjusted by the residence time which may be determined by a few preliminary runs at the particular concentrations, temperature, pressures, and the like that are adopted. After the polymerization is complete the polymer is recovered as a slurry of the solid polymer in hydrocarbon liquid and to separate the polymer from the solvent a simple filtration is adequate. Thereafter the polymer may be washed a few times in order to separate catalyst residues. Further treatment may be undertaken as will be understood from the prior art.

In a continuous mode of operating the polymerization process, the hydrocarbon solution of the reaction product of $TiCl_4$ with from 0.33 to less than 0.4 mole of aluminum triethyl, prepared as described, may be separately passed into the reaction mixture, continuously or intermittently, while sufficient aluminum diethyl chloride to bring the Al:Ti ratio above 1 is also added separately into the reaction mixture. The active catalyst is then formed in the reaction mixture by interreaction between the $TiCl_4$-aluminum triethyl reaction product and aluminum diethyl chloride.

The recovered polymer will be found, generally, to have a rather high molecular weight as indicated by intrinsic viscosity determinations in decalin at 150° C. For some applications the molecular weight may be too high and polymer of controlled molecular weight may be obtained by conducting the polymerization in the presence of various additives which limit the molecular weight of polymer produced in the reaction. The more effective additives for this purpose include hydrogen and zinc diethyl. Other additives which serve other functions may be present during the polymerization. The proportion of the crystalline content of the polymer may sometimes be increased by the use of additives, e.g., tributyl phosphite, dimethyl formamide, and the like. When operating at the most preferred conditions, however, no further improvement may result from such additives. The additives, should they be used in the polymerization, are fed into the reactor before or during the polymerization and the amounts that are used will vary depending on the specific additive and the result that it is desired to produce.

In the examples and tables that follow, the intrinsic viscosities are determined from measurements of specific viscosities in decalin at 150° C. and the insoluble content is determined by the soxhlet extraction of 6 grams of polymer in isooctane at its boiling point for 6 to 7 hours. The extraction cycle is approximately 4 minutes.

*Example 1*

This example demonstrates the nature of polypropylene prepared using a more conventional catalyst which is made by mixing stock solutions of aluminum triethyl and titanium tetrachloride in an Al:Ti ratio greater than 1:1. A brown catalyst results when aluminum triethyl and titanium tetrachloride are mixed in an Al:Ti ratio less than 0.9 and allowed to react for say two hours at 80° C. If to this brown catalyst more triethyl aluminum is added the precipitate turns black, probably due to the reduction of $TiCl_3$ to $TiCl_2$ by the excess aluminum triethyl. Catalysts prepared by either of the above methods possess a low order of stereospecificity as indicated by the low insolubles content of the polymers produced.

A black catalyst was prepared by mixing a hydrocarbon solution of 10 millimoles of $TiCl_4$ (100 ml.) with 12 millimoles of aluminum tirethyl (120 ml.) and reacting for two hours at 80° C. To this there was then added 38 millimoles of aluminum triethyl and the volume of solvent brought up to one liter. This catalyst was used to polymerize propylene which polymerization was carried out by feeding a steady stream into a reactor for one hour at 60° C. and at atmospheric pressure. The polymerization was terminated by adding a small amount of ethanol to the reactor. The polymer slurry was then added to an equal volume of ethyl alcohol to precipitate the amorphous polymer. After filtering, washing, and drying the total polymer weighed 58.5 grams and had an I.V. of 1.5. On extracting the polymer was found to be only 44% insoluble.

*Example 2*

Another catalyst was prepared by mixing under a nitrogen atmosphere a hydrocarbon solution of 10 millimoles of $TiCl_4$ (100 ml.) with 3.6 millimoles of aluminum triethyl (36 ml.) and reacting two hours at 80° C. This was then added to four liters of purified isooctane containing 46 millimoles of $AlEt_3$, making the overall Al:Ti ratio 5.0. To this reaction mixture contained in a stainless steel autoclave, propylene was added at an average pressure of 50 p.s.i.g. and 60° C. After 1.5 hours the reaction was stopped by the addition of alcohol. The polymer was recovered as previously described. The dried polymer weighed 647 g. It had an I.V. of 3.53 and was only 59% insoluble.

If instead of adding aluminum triethyl in the second step of the catalyst preparation or to the reactor during or before polymerization, one adds diethyl aluminum chloride ($AlEt_2Cl$), then the catalyst does not turn black but remains brown and its stereo-specificity is greatly improved giving polymers of high insoluble content as shown by the following example.

Example 3

A catalyst was prepared by mixing under a nitrogen atmosphere a hydrocarbon solution of 20 millimoles of $TiCl_4$ (200 ml.) with 7.2 millimoles of $AlEt_3$ (72 ml.) and reacting two hours at 80° C. This mixture was then centrifuged, the supernatant liquid decanted, and 20 millimoles (200 ml.) of $AlEt_2Cl$ added and the mixture was heated another hour at 80° C. This catalyst was then added to 4 liters of purified isooctane containing 60 millimoles of $AlEt_2Cl$ making the overall Al:Ti ratio about 4.4:1. To this reaction mixture contained in a stainless steel stirred autoclave, propylene was added at an average pressure of 50 p.s.i.g. and 50° C. After 4.5 hours the reaction was stopped by the addition of alcohol and the polymer recovered as previously described. The dried polymer weighed 439 g. It has an I.V. of 8.8. and was 90% insoluble in hot isooctane.

Examples 4–9

In this series of experiments the criticality of the mole ratio of aluminum triethyl to the titanium tetrachloride in the first step is illustrated. In all cases the catalyst components were used as heptane solutions of 100 millimoles per liter. Twenty millimoles of $TiCl_4$ (200 ml.) were reacted with various amounts of $AlEt_3$ for two hours at 80° C. Thereafter the resulting suspensions were treated for one hour at 80° C. with 20 millimoles of $AlEt_2Cl$ (200 ml.). The catalysts were used with 4 liters of solvent containing 60 millimoles of $AlEt_2Cl$. Polymerizations were carried out at 50° C. with an average propylene pressure of 50 p.s.i.g. The results are shown in Table I.

TABLE I

| Example | 4 | 5 | 6 | 7 | 8 | 9 |
| --- | --- | --- | --- | --- | --- | --- |
| $AlEt_3/TiCl_4$, mole ratio in 1st step | .2 | .3 | .36 | .4 | .5 | .6 |
| Yield, grams | 295 | 398 | 439 | 319 | 338 | 304 |
| Length of run, hours | 5 | 5 | 4.5 | 3.2 | 6 | 6 |
| Percent w., Insoluble | 92 | 90 | 90 | 83 | 64 | 45 |
| I.V. | 9.3 | 7.8 | 8.8 | 8.0 | 7.5 | 7.0 |
| Yield Point, p.s.i. | 3,860 | 3,910 | 3,770 | | | |
| Flexural Stiffness, p.s.i. | 109,000 | 106,000 | 116,000 | | | |

Examples 10 and 11

These experiments illustrate the kind of results that are obtained using other aluminum alkyls in the first step of the catalyst preparation. The procedures of Example 8 are repeated in all respects except that aluminum triisobutyl and aluminum tripropyl, respectively, are used instead of the aluminum triethyl. The results are shown in Table II.

TABLE II

| $AlR_3$ | Al triisobutyl | Al tripropyl |
| --- | --- | --- |
| $AlR_3/TiCl_4$, mole ratio | .5 | .5 |
| Yield, grams | 255 | 281 |
| Length of run, hours | 6 | 6 |
| Percent w., Insolubles | 57 | 60 |
| I.V. | 4.1 | 4.3 |

Examples 12–16

These examples are illustrative of other low pressure catalyst systems and indicate still further the criticality of the catalyst systems of this invention. The polymerizations were carried out in 50 ml. of heptane at 125 p.s.i.g. of propylene and at 85° C. The catalysts were prepared by mixing $TiCl_4$ and the indicated reducing agent, and reacting them at the indicated time and temperature. The results are summarized in Table III.

TABLE III

| Ex. | $TiCl_4$, mmoles | Reducing agent, mmoles | Pretreatment time, hr./° C. | $AlR_3$ in 2d step, mmoles | Run time, hr. | Percent insoluble |
| --- | --- | --- | --- | --- | --- | --- |
| 12 | 4.6 | 12.5 $AlEt_3$ | 0/0 | | 2.0 | 22.0 |
| 13 | 4.6 | 4.6 $AlEt_3$ | 1/225 | 14 $AlEt_3$ | 1.0 | 54.0 |
| 14 | 4.6 | 2.9 $Al(iBu)_3$ | 1/250 | 6.3 $Al(iBu)_3$ | 2.0 | 69.0 |
| 15 | 4.0 | 8.0 Na | .1/175 | 10 $AlEt_3$ | 7.0 | 42.0 |
| 16 | 4.0 | 20 NaH | 1/300 | 13 $AlEt_3$ | 2.0 | 42.0 |

As previously indicated some advantage will be realized if the heating cycle in the first step of the catalyst preparation is extended. This is shown in the following examples.

Examples 17–20

The catalyst was prepared by reacting 10 millimoles of $TiCl_4$ (100 ml.) with 3 millimoles of $AlEt_3$ (30 ml.) for various lengths of time at 80° C. Thereafter 10 millimoles of $AlEt_2Cl$ was added as a 20% solution in isooctane and the heating was continued for another hour at 80° C. This catalyst was used with 4 liters of purified isooctane containing 50 millimoles of $AlEt_2Cl$. Polymerizations were at 50° C. with 60 p.s.i.g. propylene pressure. The effect of varying the heating period is shown in Table IV.

TABLE IV

| Example | Heating Time, hours | Percent Insolubles | Yield point stress, p.s.i. ASTM |
| --- | --- | --- | --- |
| 17 | .25 | 86 | 3,660 |
| 18 | 1 | 93 | 3,670 |
| 19 | 2 | 94 | 4,300 |
| 20 | 24 | 96 | 4,750 |

From Table IV, it will be observed that the longer heat treatment raises considerably the insolubles content of the polypropylene and also the yield point stress. Similar improvements are obtained if the reaction product of the aluminum triethyl and titanium tetrachloride are heated for two hours at 100° C., at 170° C. for 20 minutes or any equivalent time-temperature relationship. An equivalent time-temperature relationship is simply determined by heating the mixture of the first stage until it develops a very slight purple tinge, or longer.

In the above examples the catalyst components are mixed together in the desired mole ratios by metering solutions of 100 millimoles per liter. A surprising finding is that increasing the concentration of the solution in the catalyst preparation step while maintaining the same molar ratios will produce polymer having a high insolubles content and also a higher bulk density. The higher bulk density permits considerable improvements in the polymerization because higher polymer concentrations in the reactor are permitted without causing fouling of the reactor. Concurrently the conversion rates are quite high. This is shown in the following examples.

*Examples 21–25*

In these examples the catalyst is prepared as indicated previously by mixing the catalyst components in the concentration shown. In all cases the heat treatment in the first step was 80° C. for two hours at 80° C. for one hour in the second step. The mole ratios of the titanium tetrachloride: aluminum triethyl:aluminum diethyl chloride were 3:1:3 in the catalyst preparation step. The results are shown in Table V.

TABLE V

| Example | Concentration, mmoles/l. | | | Insolubles, Percent | I.V. | Bulk Density |
|---|---|---|---|---|---|---|
| | $TiCl_4$ | $AlEt_3$ | $AlEt_2Cl$ | | | |
| 21 | 100 | 100 | 100 | 92 | 9.6 | .08–.11 |
| 22 | 700 | 700 | 700 | 96 | 8.2 | .14–.18 |
| 23 | 980 | 835 | 820 | 95 | 10.3 | .14–.17 |
| 24 | 973 | 1,090 | 935 | 94 | 8.0 | .13–.15 |
| 25 | 1,200 | 1,200 | 1,200 | 95 | 9.4 | .14–.18 |

*Examples 26–30*

These experiments illustrate the use of the catalyst system of this invention with various different monomers, and also provide some comparative data with other catalyst systems.

The polymerizations were carried out in 100 ml. n-heptane. The catalyst in Example 26 was prepared by reacting $TiCl_4$ with aluminum triethyl in an Al:Ti ratio of 2.5:1 and adding no further aluminum alkyl. Runs 27–30 were carried out in accordance with this invention by reacting $TiCl_4$ with aluminum triethyl in an Al:Ti ratio of 0.33:1, and then adding the indicated amount of aluminum diethyl chloride to the reaction mixture. The time and temperature used in reacting $TiCl_4$ with aluminum triethyl and used in the polymerization itself are included in the summary of results in Table VI.

In comparing runs 27 and 28 with 26, it is seen that with the same monomer and at otherwise comparable conditions the method of this invention results in much higher yields of more crystalline polymer. Runs 29 and 30 illustrate good results according to this invention with still other monomers. Similarly good results are obtained with other monomers, e.g., pentene-1 or octene-1. Similarly good results are also obtained by substituting aluminum diethyl bromide for the chloride.

From the foregoing examples and description it will be seen that no variations in the catalyst components are permitted. Variations in the proportions, within specified limits, are permitted as well as in heat treatment conditions and concentrations of the solutions of the catalyst component. In respect to the latter, the concentration preferably is in excess of about 200 millimoles per liter of solvent, and more preferably in excess of about 250 millimoles per liter. In regard to the heat treatment conditions, it is not necessary to heat the catalyst composition after the addition of the aluminum diethyl chloride although a brief heating will hasten the catalyst preparation step.

We claim as our invention:

1. A process for polymerization of propylene to a highly crystalline reaction product which comprises reacting aluminum triethyl and titanium tetrachloride in a hydrocarbon medium in a mole ratio of from 0.33:1 to less than 0.4:1, at elevated temperatures at least until all the aluminum triethyl is oxidized, adding the resulting product to a reaction mixture containing propylene as sole polymerizable constituent, said reaction mixture being maintained at a temperature below 100° C., and separately adding to the resulting reaction mixture sufficient aluminum diethyl chloride to provide a total aluminum to titanium mole ratio of at least 1:1.

2. A process for the polymerization of an alpha-monoolefin to a highly crystalline reaction product which comprises reacting aluminum triethyl and titanium tetrachloride in a hydrocarbon medium in a mole ratio of from 0.33:1 to less than 0.4:1, at elevated temperatures at least until all the aluminum triethyl is oxidized, adding the resulting product to a reaction mixture containing an alpha-monoolefin as sole polymerizable constituent, said reaction mixture being maintained at a temperature below 100° C., and separately adding to the resulting reaction mixture sufficient aluminum diethyl chloride to provide a total aluminum-to-titanium mole ratio of at least 1:1.

3. A process according to claim 2 in which said alpha-olefin has from 3 to 8 carbon atoms per molecule.

TABLE VI

| Example | Compound | Amount, g. | $TiCl_4$, mmoles | $AlEt_3$, mmoles | Cat. Prep. Reaction Time at ° C. | $AlEt_2Cl$, mmoles | Polymerization Reaction Time at ° C. | Yield of Solid Polymer, percent | I.V. | Insolubles, percent |
|---|---|---|---|---|---|---|---|---|---|---|
| 26 | 4-methyl-1-pentene | 39 | 2 | 5 | | 0 | 24 hrs. at 50° | 16 | 5.0 | 56 |
| 27 | do | 39 | 2 | .66 | 2 hrs at 80° | 7.2 | 24 hrs. at 50° | 95 | 4.2 | 82 |
| 28 | do | 20 | 1.2 | .40 | ½ hr. at 160° | 3.5 | 24 hrs. at 50° | 98 | 5.5 | 95 |
| 29 | 3-methyl-1-pentene | 20 | 4 | 1.33 | 2 hrs. at 80° | 14.4 | 65 hrs. at 70° | 75 | | 94 |
| 30 | Vinylcyclohexane | 24 | 4 | 1.33 | 2 hrs. at 80° | 14.4 | 7 days at 50° | 91 | 1.7 | 96 |

References Cited by the Examiner

UNITED STATES PATENTS 2,943,063 6/1960 Eby et al. _____ 260—93.7
2,971,925 2/1961 Winkler et al. _____ 260—93.7
2,976,271 3/1961 Lippincott et al. ____ 260—93.7
3,030,350 4/1962 De Jong et al. _____ 260—94.9

FOREIGN PATENTS 546,846 4/1956 Belgium.

JOSEPH L. SCHOFER, *Primary Examiner.*

LESLIE H. GASTON, JOSEPH R. LIBERMAN, WILLIAM H. SHORT, *Examiners.*

F. L. DENSON, *Assistant Examiner.*